United States Patent

[11] 3,581,179

[72] Inventor  Johnny W. Jones
              Tulsa, Okla.
[21] Appl. No. 857,078
[22] Filed     Sept. 11, 1969
[45] Patented  May 25, 1971
[73] Assignee  Borg-Warner Corporation
               Chicago, Ill.

[54] MULTIPHASE MOTOR CONTROL SYSTEM WITH OVERCURRENT AND UNDERCURRENT PROTECTION
     5 Claims, 3 Drawing Figs.
[52] U.S. Cl. .................................................. 318/452,
                                                  317/13, 317/18
[51] Int. Cl. ..................................................... H02p 3/00
[50] Field of Search ............................................. 307/94;
                                        317/13, 18, 26; 318/447, 452

[56]                    References Cited
                  UNITED STATES PATENTS
2,361,208  10/1944  Hunt ............................. 317/26
2,965,810  12/1960  Claybourn et al. ............. 317/26X
3,248,609   4/1966  Gambale ........................ 317/26X
3,341,741   9/1967  Swimmings .................... 317/18
3,388,305   6/1968  Smith ............................ 318/452X
RE26,483   11/1968  Legg ............................. 318/447

*Primary Examiner*—Benjamin Dobeck
*Assistant Examiner*—Gene Z. Rubinson
*Attorneys*—Donald W. Banner, William S. McCurry and John W. Butcher ABSTRACT: A multiphase motor control system includes an indicator and detector assembly having a meter relay for each phase circuit. Each meter relay has a pair of light-activated silicon controlled rectifiers (LASCR's) which are normally conductive when illuminated from a pair of lamps indicating the phase current is below a high level setting, and above a low level setting. If any phase current exceeds the high level setting, the meter movement displaces a shutter which blocks the light from the high-current lamp, deenergizing the LASCR and deenergizing a first control relay, which is coupled to all the high-current circuits, to shut down the system. Correspondingly, decrease of any phase current below the preset low level causes a reduction of illumination on the low level SCR, and drops out a second control relay, also coupled to the other low-current circuits. The control circuit includes the first and second control relays and associated components for regulating, consonant with suitable time delay, energization and deenergization of the motor. A single power supply energizes the meter relays and the control relays in the control circuit.

Inventor
Johnny W. Jones
By James J. Jennings, Jr.
Attorney 3,581,179

MULTIPHASE MOTOR CONTROL SYSTEM WITH OVERCURRENT AND UNDERCURRENT PROTECTION

BACKGROUND OF THE INVENTION

The present invention is useful in connection with various motor control systems, and in particular for the regulation of a motor which drives a submersible pump positioned in an oil well bore hole at a considerable distance below the surface. The motor and pump are usually joined in one assembly located down hole at the pumping location. It is requisite that this remote equipment be protected against undesirable operating conditions, such as when there is no fluid in the bore hole, a condition known as "pump-off." It is similarly important to protect the motor against overloading or short circuit conditions which would pass more current to the motor than the equipment can tolerate. In addition if only one phase conductor of the motor is severed, or shortened out either to another phase conductor or to ground, protection against the resultant phase unbalance must also be provided.

Considerable work has been done toward the solution of these problems. One significant advance in this art is described and claimed in Reissue U.S. Pat. No. 26, 483, entitled "Control System for Power Units such as Electric Motors and the like," which issued Nov. 5, 1968 in the name of Leo V. Legg, and is assigned to the assignee of this invention. In that system, protection against certain of the conditions noted above was obtained, but it was also necessary to use considerable equipment. For example, an individual control relay and an individual power supply for each meter relay were required.

It is, therefore, a principal consideration of the present invention to provide a compact and economical motor control system which not only solves the problems enumerated above, but is also less expensive and occupies less space than previous arrangements.

It is a corollary consideration of this invention to provide an effective motor control system with a small number of component parts and which achieves effective, fail-safe operation.

SUMMARY OF THE INVENTION

A control system constructed in accordance with the present invention is useful for regulating energization of a multiphase motor from a multiphase power input circuit. The system includes a main switch relay having a winding and main switch contacts for transferring multiphase energy to the motor. A current transformer is connected to provide current signals, each of which is a function of the current flowing over one phase conductor to the motor.

Particularly in accordance with the present invention, an indicator and detector assembly is coupled to the current transformer. This assembly includes a meter relay for each phase circuit, which relay has first and second semiconductor switches. The first semiconductor switch in each meter relay is conductive when the respective phase current is below the preset high level, and the second semiconductor switch in each meter relay is conductive when the respective phase current is above the preset low level. A first series circuit includes a first conductor coupled in series with all the first semiconductor switches to provide a first control signal indicating all the phase currents are below the preset high level, and a second series circuit comprises a second conductor coupled in series with all the second semiconductor switches to provide a second control signal indicating all the phase currents are above the preset low level.

A control circuit is provided, including a primary start relay having a winding coupled in series with a start button and a normally closed delayed contact set. A delayed start relay is provided to actuate the delayed contact set after the phase currents exceed the preset low level. This delayed start relay has its winding coupled in parallel with a series circuit including the primary start relay winding and the delayed contact set. The main switch relay winding is connected for energization responsive to closure of a contact set of the primary start relay to close the main switch contacts and energize the motor. Relay means is connected to operate in the absence of either of the first and second control signals to deenergize the main switch relay and deenergize the motor.

Means is also provided for energizing the control system. This means can be a pair of conductors for coupling to a power source, or may include an internal power supply.

THE DRAWINGS

In the several figures of the drawings like reference numerals identify like elements, and in the drawing:

FIG. 1 is a block diagram of a motor control system intercoupled in accordance with the inventive teaching; and FIGS. 2 and 3 are schematic diagrams depicting details of the system shown generally in FIG. 1.

GENERAL SYSTEM DESCRIPTION

Considering the block showing of FIG. 1, a multiphase motor 15 is shown connected for energization over a main switch 29 when an AC energizing voltage is provided over an AC circuit including the conductors 100, 101, and 102. This AC circuit in turn is energized when disconnect switch 103 is closed to transfer AC energy from the power mains represented by conductors 18, 19 and 20 to the conductors 100, 101 and 102. A current transformer 25 is connected to provide current level signals over the conductors referenced 104, 105 and 106 to an indicator and detector assembly 110. This assembly also receives power over a conductor 107 from a power supply 108. When all the phase currents on conductors 100, 101 and 102 are below the preset high level, indicator and detector assembly 110 passes a first control signal over conductor 112 to control circuit 26. When all the phase currents are also above a preset low current level, assembly 110 passes a second control signal over conductor 114 to control circuit 26. If either of these first and second control signals disappears, indicating some phase unbalance or other disturbance on the power line, control circuit 26 operates over circuitry represented by line 113 to open main switch 29 and deenergize the motor.

DETAILED DESCRIPTION OF THE INVENTION

Figure 1:
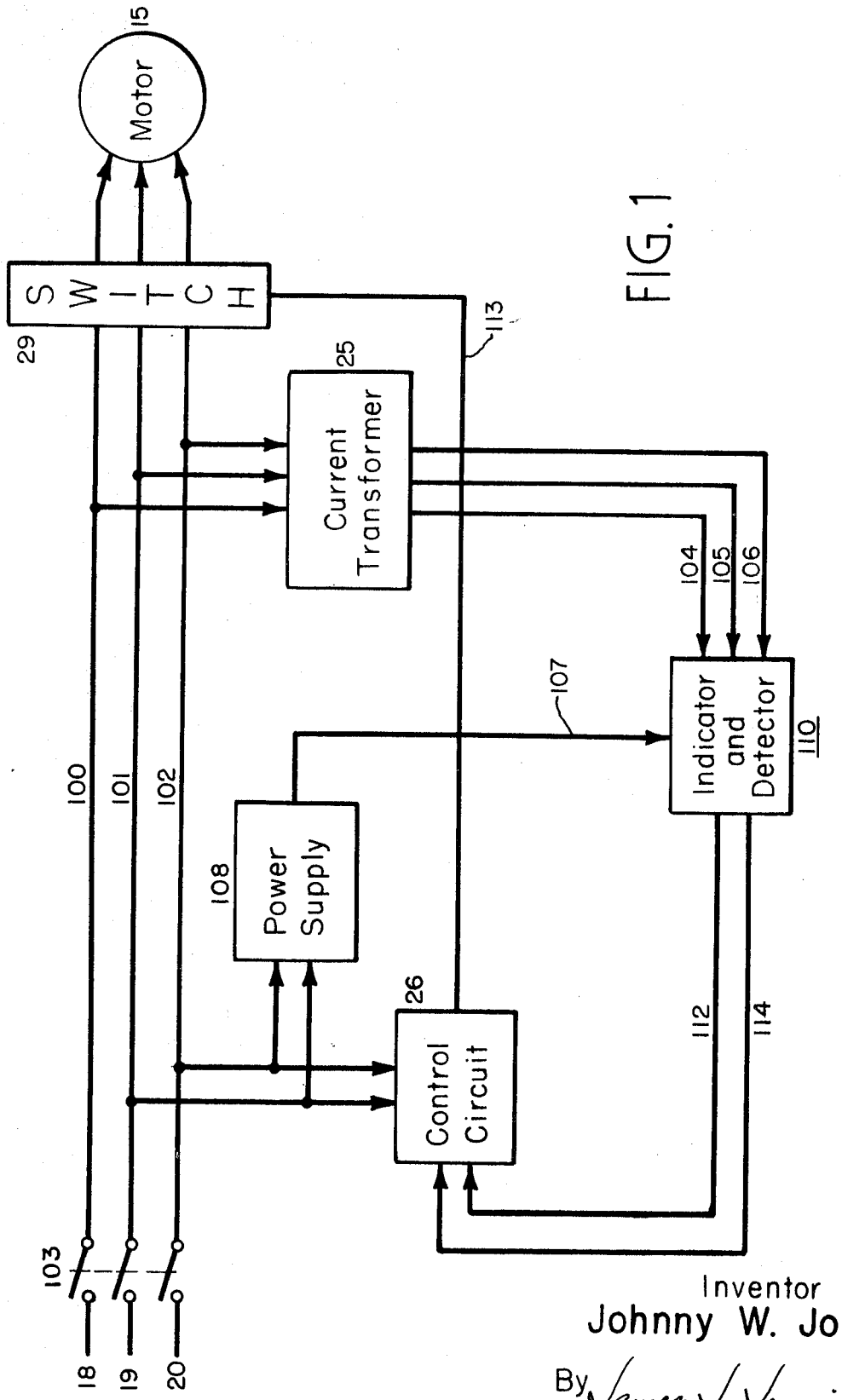
Figure 2:
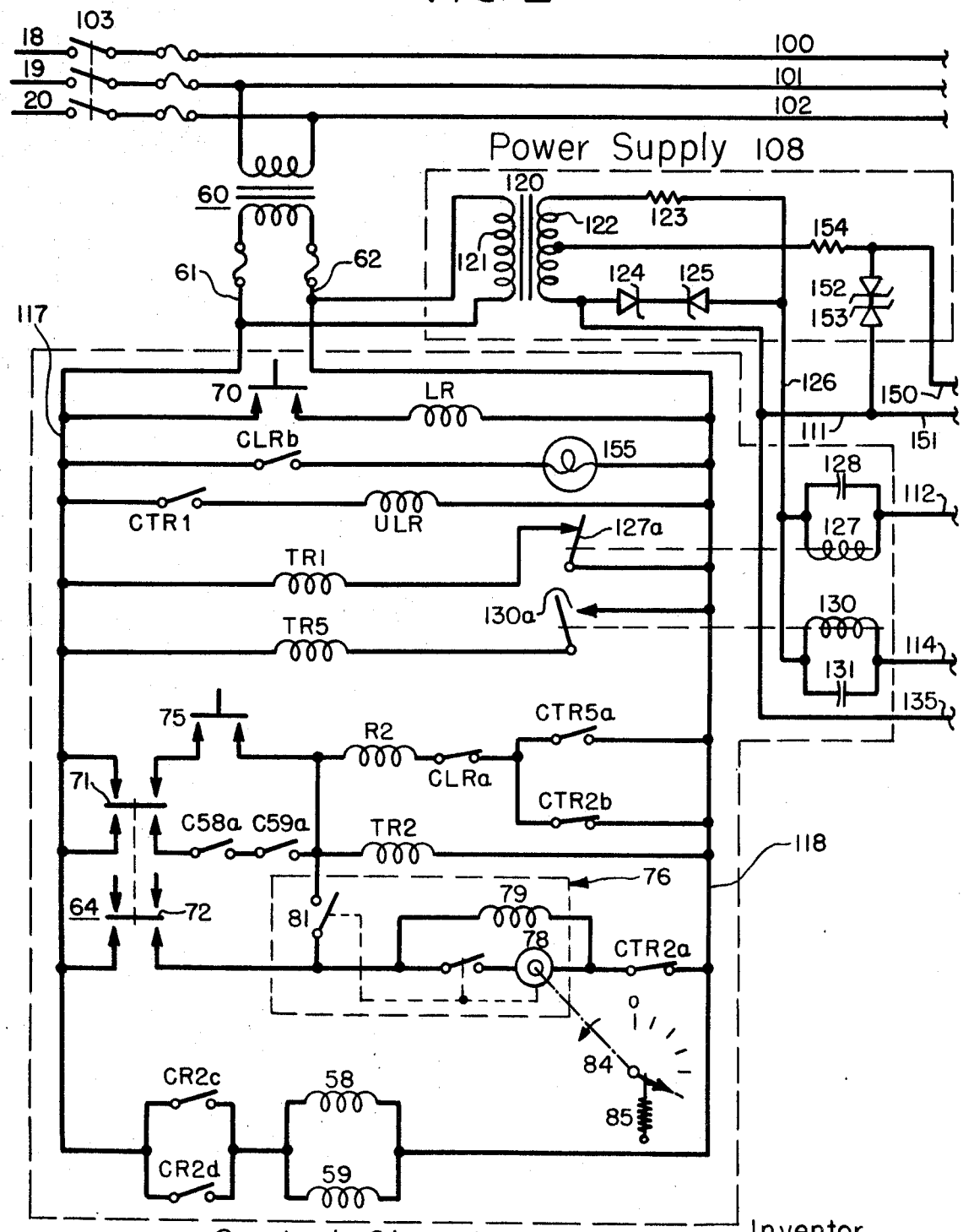
Figure 3:
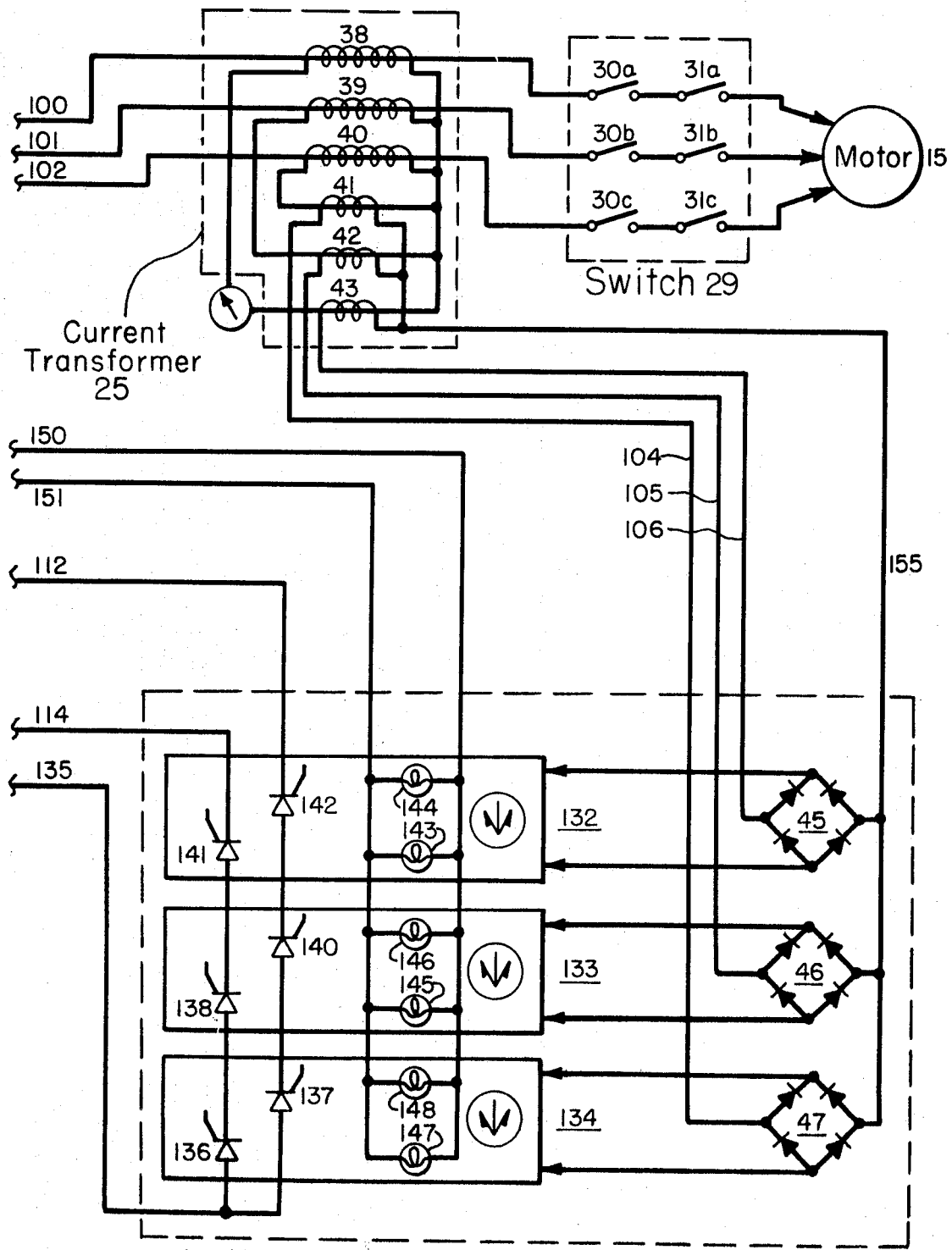

As shown in FIGS. 2 and 3, upon closure of disconnect switch 103 power from the main supply conductors 18, 19 and 20 is transferred over input conductors 100, 101 and 102 to the windings 38, 39 and 40 of current transformer 25, and over the contacts of switch 29 to energize multiphase motor 15. It is understood that, although current transformer 25 is shown as including six individual current transformers, the same function can be accomplished with only three transformers. Although the system is described in connection with a three-phase circuit, those skilled in the art will appreciate that the teachings are equally applicable to any other multiple-phase system.

When disconnect switch 103 is closed, single phase energy is transferred from conductors 101, 102 over the transformer 60 and conductors 61, 62, coupled to the secondary winding of this transformer, to the supply conductors 117, 118 of control circuit 26. The voltage on conductors 61, 62 is also applied to the primary winding 121 of a step-down transformer 120, which includes a center-tapped secondary winding 122. A resistor 123 is coupled to the upper end of secondary winding 122. A pair of Zener diodes 124, 125 are coupled in series in the opposite sense, with the anode of diode 124 coupled to the other end of secondary winding 122, and the anode of diode 125 coupled to the end of resistor 123. The common connection between resistor 123 and diode 125 is coupled over conductor 126 to one end of a first control relay winding 127, which has a capacitor 128 coupled in parallel with its winding. Conductor 126 is also coupled to one end of a second control relay winding 130, across which a capacitor 131 is coupled. A first output conductor 112 extends from the first semiconductor switch 142 in meter relay 132 to the winding 127 of the first control relay, which relay operates to indicate all the phase currents are below the preset high level. A second output conductor 114 extends from the second semiconductor switch 141 in meter relay 132 to the winding 130 of the second control relay, which operates to indicate all the phase currents are above the preset low level value. A common conductor 135 is coupled between the lower end portion of secondary winding 122 in the power supply and the cathodes of the light-activated silicon controlled rectifiers (LASCR's) 136, 137 in the meter relay 134. Meter relay 133 likewise includes a low set LASCR 138 and a high level indicating semiconductor switch 140.

In meter relay 132 a pair of lamps 143, 144 are connected to illuminate and actuate LASCR's 141, 142. A similar pair of lamps 145, 146 is provided in meter relay 133, and another pair 147, 148 in meter relay 134. All the lamps 143—148 are coupled in parallel between a pair of conductors 150, 151, which in turn are coupled across a pair of Zener diodes 152, 153 in power supply 108. A resistor 154 is coupled between the center tap of secondary winding 122 and the common connection between conductor 150 and Zener diode 152. There is also a common connection, over conductor 111, between the anode of Zener diode 153 and the anode of Zener diode 124.

Although not shown, each meter relay includes a pair of adjustable shutters or shadelike components, one near the high end of the meter scale and the other near the low end. Adjustment of the shutter position near the high end of the meter scale in meter relay 132, by way of example, determines the high current set point by fixing the location at which the shutter prevents light from lamp 144 from striking LASCR 142. With no light switch 142 is opened and control relay 127 is deenergized. It is noted that this relay is in a first series circuit including winding 127, conductor 112, and all of semiconductor switches 142, 140 and 137. Similarly a second series circuit comprises winding 130 of the second control relay, conductor 114, and all the LASCR's 141, 138, and 136.

Current transformer 25 includes primary windings 38, 39 and 40 connected to sense the main current levels on conductors 100, 101 and 102. Windings 41, 42, and 43 pass respective phase current signals over signal conductors 104, 105, 106, and common conductor 155 to the rectifier bridge circuits 45, 46 and 47 of the respective meter relays. In practice, each rectifier bridge circuit is enclosed within the meter relay with the meter movement, lamps, shutters, and light-activated SCR's. The rectifier circuits are shown externally to assist in understanding the invention. Thus, considering only the first phase circuit and meter relay 132, when the system is energized and the current level in the first phase conductor 100 does not exceed the preset high level, lamp 144 is energized and switches on SCR 142. If the other two phase currents are also below the preset high level at this time, lamp 146 gates on LASCR 140 and lamp 148 turns on switch 137. Thus the first series circuit is completed and relay winding 127 is operated. As soon as the current level in the first phase circuit rises above the preset low level, lamp 143 is illuminated and energizes LASCR 141. With the other phase currents also above the preset low level, lamps 145 and 147 illuminate LASCR's 138 and 136, turning these switches on. Accordingly the second series circuit is completed and second control relay winding 130 is energized. Thereafter, so long as the phase currents are between the preset high and low levels, lamps 143-—148 are illuminated and LASCR's 136—142 are conducting to maintain relays 127 and 130 energized. If the phase current in any phase circuit exceeds the preset high level, light from the appropriate lamp 144, 146, or 148 will be blocked by a shutter movement to allow its associated LASCR to turn off and deenergize first control winding 127. If any phase current falls below the preset low level, the shutter displacement will block light from one of the lamps 143, 145 or 147 and allow its associated LASCR to be extinguished, thus deenergizing relay winding 130.

Considering now control circuit 26, the lower portion of this arrangement including the automatic reset timer arrangement 76 is virtually that described in the above-noted reissue patent. To the right of manual-automatic switch 64, contacts C58a and C59a replace the contacts identified CR2a and CR2b in reissue patent. To the right of relay winding R2, contact set CLRa replaces the designation CR1b, and the contact set CTR5a, shown connected in parallel with contact set CTR2b, replaces the three original contact sets 52a 54a and 56a.

At the upper portion of control circuit 26, the first circuit coupled across conductors 117, 118 includes the contacts of an overload reset pushbutton switch 70, series coupled with the first winding LR of a latching relay. That is, the contact set CLRa just to the right of winding R2 is actuated to close and remain closed upon the energization of relay winding LR. In addition, the same contact set is opened, and remains open, upon energization of the unlatch winding ULR coupled in series with contact set CTR1 between conductors 117, 118. A pilot light 155 is coupled in series with normally open contact set CLRb between conductors 117, 118.

The winding of relay TR1 is coupled in series with the normally closed contact set 127a between conductors 117, 118. Contact set 127a is opened when relay winding 127 is energized. Relay TR1 is of the type which has a built-in delay; that is, a short time elapses between energization of winding TR1 and the closing of its contact set CTR1. Winding TR5 is coupled in series with normally open contact set 130a between conductors 117 and 118. Contact set 130a is normally closed by the energization of relay winding 130. Relay TR5 is of the type which provides a time delay between deenergization of the relay winding and opening of the associated contact set CTR5a. Thus the time delays incorporated in the relays TR1 and TR5 prevent a shutdown of the motor energizing system under the regulation of the control circuit 26 when there is only a momentary excess or deficiency of any phase current, which might occasion a very brief deenergization of either of the relay windings 127, 130.

To energize the system, disconnect switch 103 is initially closed to pass three-phase AC energy received over conductors 18—20 over conductors 100—102 to the open contacts of switch 29. At this time single phase energy is passed over transformer 60 to the conductors 117, 118 of control circuit 26, and this energy is also passed over transformer 120 in power supply 108 to provide AC voltage for illuminating the lamps 143—148 and for operating the relays 127, 130 when the associated LASCR's are gated on. At this time there is also a circuit completed from the current transformer to the respective rectifier bridges 45—47 in the meter relays, but the contacts of switch 29 are open and thus there is no current flow to the meters. Accordingly, because the phase currents are all below the preset high level the lamps 144, 146 and 148 gate on the respective semiconductor switches 142, 140 and 137, completing the first series circuit which includes conductor 112 and relay winding 127. This relay operates and opens contact set 127a to interrupt the energizing circuit for relay winding TR1. Because the phase currents are all below the preset low level at this time, none of the LASCR's 141, 138 and 136 is conductive and relay 130 is deenergized.

If the equipment is being energized in the field for the first time, overload reset button 70 should be pushed to be certain that the contact set CLRa is not inadvertently in the open position. The contact set will remain closed and the overload button need not be pushed every time the equipment is actuated, unless it has been deenergized through the detection of an overload.

Assuming manual-automatic switch 64 is in the manual (upper position), start button 75 is depressed to complete an energizing circuit for winding R2 as current flows from conductor 117 over the upper contact 71 of switch 64, the contacts of switch 75, winding R2, contact set CLRa, and contact set CTR2b to conductor 118. Current also flows from start button 75 over winding TR2 to conductor 118; operation of time delay relay TR2 is described in the succeeding paragraph. Relay R2 operates and closes the parallel-connected contact sets CR2c, CR2d, both coupled to conductor 117. This completes an obvious energizing circuit for the main start relay windings 58, 59 which operate and close the six contact sets 30a—31c depicted in switch 29. Closure of these contacts completes the energizing circuit for motor 15 which begins to accelerate as the phase currents on conductors 100—102 begin to increase. The operation of relays 58, 59 also closes the series-connected contact sets C58a, C59a which complete a path that bypasses start button 75. Start button 75, like overhead reset button 70, includes a bias spring which returns it to the open position after it has been depressed. Thus the spring return of this start button does not interrupt the energizing circuit for relay winding R2.

At the same time the energizing circuit for relay winding R2 was completed, relay winding TR2 was also energized over the start button contacts. However TR2 incorporates a built-in time delay, which in one embodiment of the invention was set at about 20 seconds to allow the phase currents to rise above the low set points of the respective meter relays 132—134. Assuming that the phase currents are in fact above the low set point before the expiration of the time delay in TR2, lamps 143, 145 and 147 illuminate all of the LASCR's 141, 138 and 136 to complete the second series circuit including conductor 114 and winding 130. Relay 130 operates and at its contact set 130a completes an energizing circuit for relay TR5, which immediately energizes and closes its contact set CTR5a, shown connected in parallel with contact set CTR2b. Thus, at the expiration of the preset time delay of relay TR2, contact set CTR2b opens but at this time the main start relay winding R2 is still energized over the contact set CTR5a. If for some reason the phase currents have not risen above the low set point, both contact sets CTR5a and CTR2b will be open at the expiration of the TR2 time delay, causing the system to shut down and allow the operator to determine the reason for lack of appropriate energization.

After the system is operating, if any phase current goes above the preset high level the light from one of the lamps 144, 146 and 148 will be blocked to interrupt the first series circuit including winding 127, allowing contact set 127a to close and complete the energizing circuit for relay winding TR1. If the high current condition is not a brief transient and this relay winding 127 is again not energized before the energization delay period of TR1, relay TR1 operates and at its contact set CTR1 completes an energizing circuit for unlatch winding ULR, which opens contact set CTRa. This interrupts the energizing circuit for main start relay R2 and shuts down the equipment.

In an analogous manner if any phase current falls below the preset low level, relay 130 is deenergized and contact set 130a opens to interrupt the energizing circuit of relay TR5, which includes a built-in delay upon deenergization. At the expiration of this delay contact set CTR5a drops out and, because CTR2b is already open, main start relay R2 is deenergized and the equipment is shut down. The remainder of the system including the automatic recycling by the components depicted in the box 76, is known from the explanation given in the reissue patent identified above.

The economy, efficiency and compactness of the present invention is also manifest when contrasted to the showing of the effective system explained in the reissue patent. This invention utilizes only two relays, 127 and 130, to signal the overcurrent and undercurrent conditions whereas six individual relays were required in the earlier system. The present invention provides fail-safe operation because failure of any lamp or any LASCR provides the same circuit conditions as a phase overcurrent or undercurrent to shut down the system. In addition only one power supply, referenced 108, is required in the present arrangement whereas in the previous system three individual power supplies, one in each phase circuit, were required.

While only a particular embodiment of the invention has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What I claim is:

1. A control system for regulating energization of a multiphase motor from a multiphase power input circuit, including a main switch relay having a winding and main switch contacts for transferring multiphase energy to the motor, and a current transformer connected to provide current signals each of which is a function of the current flowing over one phase conductor to the motor, the improvement which comprises:

an indicator and detector assembly coupled to said current transformer, including a meter relay for each phase circuit, which relay has first and second semiconductor switches, the first semiconductor switch in each meter relay being conductive when the respective phase current is below the preset high level and the second semiconductor switch in each meter relay being conductive when the respective phase current is above the preset low level, a first series circuit including a first conductor coupled in series with all the first semiconductor switches to provide a first control signal indicating all the phase currents are below the preset high level, and a second series circuit comprising a second conductor coupled in series with all the second semiconductor switches to provide a second control signal indicating all the phase currents are above the preset low level, a control circuit, including a primary start relay having a winding coupled in series with a start button and a normally closed delayed contact set, a delayed start relay for actuating said delayed contact set after the phase currents exceed the preset low level, which delayed start relay has its winding coupled in parallel with a series circuit including the primary start relay winding and said delayed contact set, said main switch relay winding being connected for energization responsive to closure of a contact set of the primary start relay to close the main switch contacts and energize the motor, and relay means connected to operate in the absence of either of said first and second control signals to effect deenergization of said main switch relay and deenergize the motor, and means for energizing said control system.

2. A control system as claimed in claim 1 in which said meter relay for each phase circuit comprises a pair of lamps, and in which said first and second semiconductor switches are connected to be normally conducting when said lamps are illuminated, said first series circuit further comprises a first control relay winding which is energized when all the phase currents are below the preset high level, said second series circuit further including a second control relay winding which is energized when all the phase currents are above the preset low level setting.

3. A control system as claimed in claim 2 in which said control circuit further comprises a first trip relay having a winding coupled in series with a contact set of the first control relay such that the first control relay contact set closes responsive to deenergization of the first control relay to complete an energizing circuit for the first trip relay, said first trip relay further comprising a contact set connected to close responsive to operation of the first trip relay to deenergize the primary start relay which deenergizes the main switch relay and correspondingly deenergizes the motor, and a second trip relay having a winding coupled in series with a contact set of the second control relay such that the second control relay contact set opens responsive to deenergization of the second control relay to interrupt an energizing circuit for the second trip relay, said second trip relay further comprising a contact set, coupled in parallel with said delayed contact set, and connected to open responsive to deenergization of the second trip relay to deenergize the primary start relay which deenergizes the main switch relay and correspondingly deenergizes the motor.

4. A control system for regulating energization of a three-phase motor from a three-phase power input circuit, including a main switch relay having a winding and main switch contacts for transferring three-phase AC energy to the motor, and a current transformer connected to provide current signals each of which is a function of the current flowing over one phase conductor to the motor, the improvement which comprises:

an indicator and detector assembly coupled to said current transformer, including a meter relay for each phase circuit, which meter relay has first and second light-sensitive semiconductor switches, a first lamp in the meter relay connected to apply a gating signal to the first semiconductor switch and render the first switch conductive when the respective phase current is below the preset high level, and a second lamp in the meter relay connected to apply a gating signal to the second semiconductor switch and render the second switch conductive when the respective phase current is above the preset low level, a first series circuit including a first control relay winding coupled in series with a first conductor and with all the first semiconductor switches to provide a first control signal which energizes the first control relay when all the phase currents are below the preset high level, and a second series circuit including a second control relay winding coupled in series with a second conductor and with all the second semiconductor switches to provide a second control signal which energizes the second control relay when all the phase currents are above the preset low level, a control circuit, including a primary start relay having a winding coupled in series with a start button and a normally closed delayed contact set, a delayed start relay for actuating said delayed contact set after the phase currents exceed the preset low level, which delayed start relay has its winding coupled in parallel with a series circuit including the primary start relay winding and said delayed contact set, said main switch relay winding being connected for energization responsive to closure of a contact set of the primary start relay to close the main switch contacts and energize the motor, and trip relay means connected to change state in the absence of either of said first and second control signals to effect deenergization of said main switch relay and deenergize the motor, and means for energizing said control system.

5. A control system as claimed in claim 4 in which said trip relay means comprises a first trip relay having a winding coupled in series with a contact set of the first control relay such that the first control relay contact set closes responsive to deenergization of the first control relay to complete an energizing circuit for the first trip relay, said first trip relay further comprising a contact set connected to close responsive to operation of the first trip relay to deenergize the primary start relay which deenergizes the main switch relay and correspondingly deenergizes the motor, and a second trip relay having a winding coupled in series with a contact set of the second control relay such that the second control relay contact set opens responsive to deenergization of the second control relay to interrupt an energizing circuit for the second trip relay, said second trip relay further comprising a contact set, coupled in parallel with said delayed contact set, and connected to open responsive to deenergization of the second trip relay to deenergize the the primary start relay which deenergizes the main switch relay and correspondingly deenergizes the motor.